Aug. 4, 1936.  J. G. C. MANTLE  2,050,227
APPARATUS FOR MAKING HOLLOW ARTICLES
Original Filed July 18, 1924  6 Sheets-Sheet 1

INVENTOR
Joseph G. C. Mantle
BY Prindle, Bean & Mann
HIS ATTORNEYS

INVENTOR
Joseph G.C. Mantle
BY Prindle, Bean & Mann
HIS ATTORNEYS

Aug. 4, 1936. J. G. C. MANTLE 2,050,227
APPARATUS FOR MAKING HOLLOW ARTICLES
Original Filed July 18, 1924 6 Sheets-Sheet 4

INVENTOR
Joseph G.C. Mantle
BY Prindle, Bean & Mann
HIS ATTORNEYS

Aug. 4, 1936.    J. G. C. MANTLE    2,050,227
APPARATUS FOR MAKING HOLLOW ARTICLES
Original Filed July 18, 1924    6 Sheets-Sheet 6

INVENTOR
Joseph G.C.Mantle
BY Prindle, Bean & Mann
HIS ATTORNEYS

Patented Aug. 4, 1936

2,050,227

UNITED STATES PATENT OFFICE 2,050,227

APPARATUS FOR MAKING HOLLOW ARTICLES

Joseph G. C. Mantle, Leonia, N. J., assignor, by mesne assignments, to Bridgeport Thermostat Company, Inc., Bridgeport, Conn., a corporation of Delaware Original application July 18, 1924, Serial No. 726,671. Divided and this application February 3, 1930, Serial No. 425,673

48 Claims. (Cl. 153—73)

This invention relates to apparatus for the formation of articles from shells or tubes of ductile material. The shells and tubes are usually drawn from sheet material and are either flanged or plain.

The object of this invention is the provision of apparatus to rapidly and economically transform shells or tubes into such shapes which, in general, could only hitherto be done by repeated annealings and operations, or, by first forming portions and then joining them together to form the whole. By my invention a vast number of shapes are obtained in a single operation which the limited ductility of the material comprising the shell or tube would otherwise have rendered impossible.

Figures 1, 2, 3:
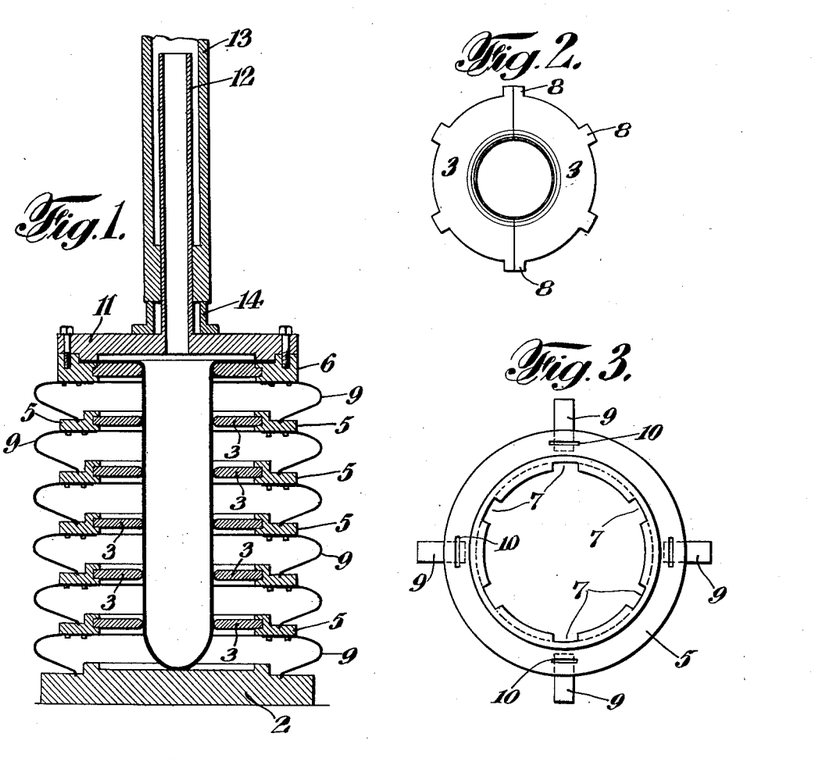
Figure 1 shows a contractible mold with a flanged shell therein.
Figures 2 and 3 are separate views of parts of the contractible mold shown in Figure 1.
Figure 7:
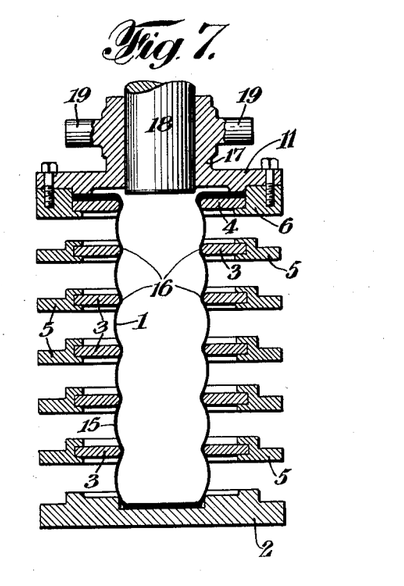

Referring to Figure 1, the flanged shell 1 is supported in a contractible-mold consisting of parts 2 and 3. Each of the parts 3 consists of two complemental pieces, as shown in Figure 2, and they are supported and held together in holders 5 and 6. Figure 3 shows a holder; each holder has an annular groove and is provided with cutaway portions 7 corresponding to lugs 8 on the mold-parts 3 and 4, so that they may be placed therein and when given a slight twist they are supported and held together or prevented from spreading apart. Each holder has an attached set of springs 9, the free ends of which are adapted to fit into grooves 10 on the upper surfaces of the holders 5 and the mold-part 2. These springs sustain the holders in correct relation to each other, and also act as guides in preventing lateral movement. The holder 6 is secured to a top-plate 11 which is provided with a tube 12 which telescopes into a reservoir 13 containing fluid under pressure. Between the reservoir 13 and the top plate 11 is a removable stop-piece 14. The stop-piece 14 having been removed, the top plate slid up to the reservoir, the holders with their mold-parts assembled on the mold-part 2, the shell placed therein, the holder 6 secured to the top plate and the stop-piece slid into place, the whole is ready for the operation, which is as follows:

Fluid, usually water, under a pressure varying in accordance to the nature of the shell, is permitted to pass through the tube 12 and fill the shell, and then by reason thereof and on account of the shell being longitudinally confined, a change in shape occurs, as shown in Figure 7 viz., bulgings of the shell between the contacts of the mold-parts and creasings of the shell at the intermediate parts in contact with the mold-parts, as respectively shown at 15 and 16 in Figure 7. Subsequently and whilst under sustained fluid pressure the contractible-mold is compressed, preferably by a downward pressure applied by mechanical means to the top plate 11, until the parts are brought together, or, to any desired intermediate position. In the example shown, the mold-parts are equidistant, and on account of the creasings 16 they retain their initial positions with respect to the contact with the shell during the whole of the compression of the contractible-mold.

In certain instances it is preferable to form these creasings (by rolling or otherwise) prior to the placement of the shell in the contractible mold, in which case the compression of the contractible mold may commence at the same time as the internal fluid pressure.

Unless the movement of the mold-parts of the contractible-mold, at the commencement of and during the contraction of the contractible-mold, are individually and positively controlled by additional and positive means it is necessary that these creasings are formed in the shell prior to the commencement of the contraction of the contractible-mold. Of the two ways of creasing the shell, that by means of internal fluid pressure is the speedier, for there need be no interval of time between the two stages or steps of the operation. The entire operation is a speedy one, and in very many instances may be performed on an ordinary power press operating at the customary speed of drawing a shell. The shell or tube filled with a liquid, usually water, is placed in the contractible-mold and the internal fluid pressure is produced by the downward movement of a plunger carried by the punch-holder or slide of the press, against and into the water or other liquid contained in the shell and at the same time the punch-holder or slide of the press operates mechanism which immediately afterwards compresses the contractible-mold.

Figure 5:
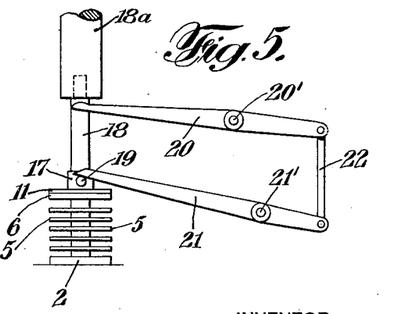
Figure 6:
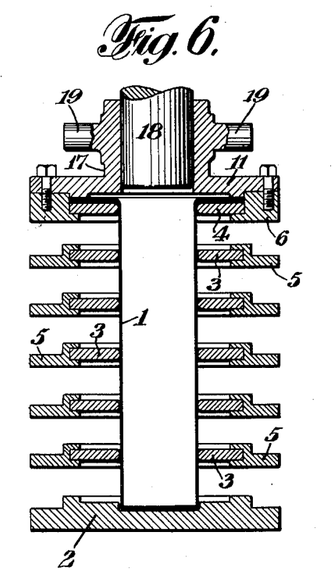
Figures 6 and 7 show a contractible-mold with a flanged shell therein at different stages of the operation, the whole so arranged that the internal fluid pressure may be applied and the contraction of the contractible-mold effected by the punch-holder or slide of an ordinary power press.

Referring to Figures 6 and 7, the top plate 11 is provided with a sleeve through which operates the plunger 18 attached to the punch-holder of the press. The sleeve 17 is provided with lugs 19 adapted to be acted upon by mechanism operated by the punch-holder of the press. Referring to Figure 5, which is drawn to a smaller scale, 20 and 21 are levers fulcrumed at 20' and 21', and connected by a link 22. Lever 20 is adapted to be pressed downwardly by the punch-holder 18ᵃ, and the forked-end of lever 21 is adapted to press downwardly on the lugs 19 of the sleeve of the top plate. The mechanism is shown in position corresponding to Figure 6. A slight downward movement of the punch-holder 18ᵃ brings it in contact with lever 20 and has brought the plunger 18 into the position shown in Figure 7, and has caused the creasings 16, as is shown therein, and the further movement of the punch-holder brings the plunger downward and has caused the mechanism, shown in Figure 5 to force the top plate 11 downwards, thus compressing the contractible-mold.

Figure 4:
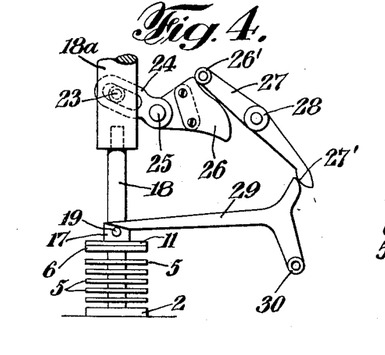
Figures 4 and 5 show two forms of mechanism by which the punch-holder may contract the contractible-mold whilst applying the internal fluid pressure.

In forming different shapes a different relative movement of plunger and top plate is usually necessary, and a mechanism which by the mere change of one of its members will give the correct movement, is preferable. Referring to Figure 4 a stud and roller 23 carried by the punch-holder 18ᵃ engages the slot in an arm of the lever 24 fulcrumed at 25. A cam 26 is attached by screws to the lever arm 24. Lever 27 fulcrumed at 28 carries a roller 26' engaging cam 26 and the end 27' of the lever 27 engages an arm of the lever 29 which is fulcrumed at 30. Lever 29 has a forked-end adapted to press downwardly on the lugs 19 of the sleeve of the top plate for the purpose of compressing the contractible-mold. The punch-holder is shown holding the plunger in the position of Figure 6, and during the first part of the downward movement the roller 26' is on a concentric part of the cam and no movement is given to the lever 27 until the plunger and shell is as shown in Figure 7, and then the movement of the levers commence, and continue until the plunger and contractible-mold are moved downward to form the corrugated article. The roller 26' is then on the part of the cam which is farthest from the fulcrum 25. Beyond this part of the cam there may be another concentric part permitting a further downward movement of the plunger after the complete compression of the contractible-mold so that the shell may be further extended and completely fill the contractible-mold.

Figure 8:
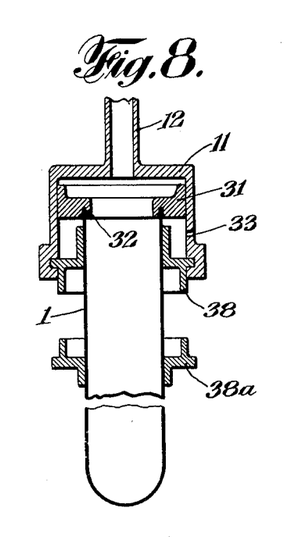
Figures 8 and 9 show means of preventing leakage of the fluid from a flangeless shell.
Figure 9:
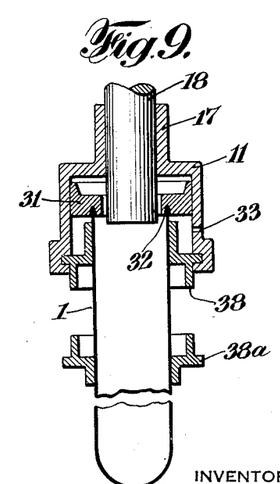

In the examples so far described, leakage of the fluid is prevented by the nipping of the flange of the shell between the top plate and the uppermost holder. When a flangeless shell is used, the top plate 11 may contain a piston 31 (see Figures 8 and 9) having a groove 32, preferably V shaped adapted to receive the end of the shell. Figure 8 shows the top plate equipped with a tube 12 which may telescope into, or be otherwise connected to, a reservoir containing fluid under pressure, whilst Figure 9 shows the top plate 11 equipped with a sleeve 17 through which a plunger 18 may operate, as shown in Figures 6 and 7. It will be seen that there is an unsupported area of the piston surrounding the groove 32 which is open to the atmosphere through vent 33, consequently the shell is automatically sealed when the fluid pressure is applied to the shell. When a flangeless tube is operated on, the mold-part 2 (see Figures 1 and 6) may be provided with a groove adapted to receive the lower end of the tube and the top plate may be as in Figures 8 and 9. It should be noted that bellows-shaped articles are made according to my invention which are formed in one operation from the shell or tube. As is shown in certain figures, the depth of the corrugations in respect to the diameters of the articles is much greater than has hitherto been possible to obtain by a single operation. In other words, hitherto one or more intermediate annealings have been necessary in order to complete the formation of an article having so great a depth of corrugation in proportion to its diameter. Now this is performed in the one operation by the use of material having a certain ductility, but which, incidentally, has a degree of hardness far short of that required in the finished article and the operation itself imparts the necessary degree of hardness. Also, in many cases by this use of a determined ductile material, but which lacks other attributes required in the finished article, resilient diaphragms are obtained. For instance, such articles, as shown, are obtained having sufficient resiliency for the purpose required which are made from a low brass consisting of 85% copper and 15% zinc, and this material prior to the operation, although extremely ductile, is quite soft and practically non-resilient: but the operation gives it the required hardness and resiliency. Hitherto, such resilient articles having so great a depth of corrugation have been made, exclusively, from resilient material and during the process of making the corrugations the material has had to be annealed before the required depth could be obtained.

Bellows-shaped articles made from brass having the aforementioned proportion of copper and zinc where the initial creasings are made by internal fluid pressure prior to the contraction of the contractible-mold have a practically uniform temper throughout the corrugations. With the same kind of material, but where the initial creasings are made by the rolling operation, then not only are the corrugations of much greater depth, if so desired, the temper practically uniform throughout, but also a higher temper (by greater thinning) may be given to the inner curves of the corrugations. This higher temper in the inner curves gives greater durability and the reason of it appears to be that the higher temper in the inner curve of the less cross section than the outer curve—both having the same thickness—gives equal resistance, or resiliency to the inner and outer curves.

Figures 10, 11, 12, 13, 14, 15, 16:
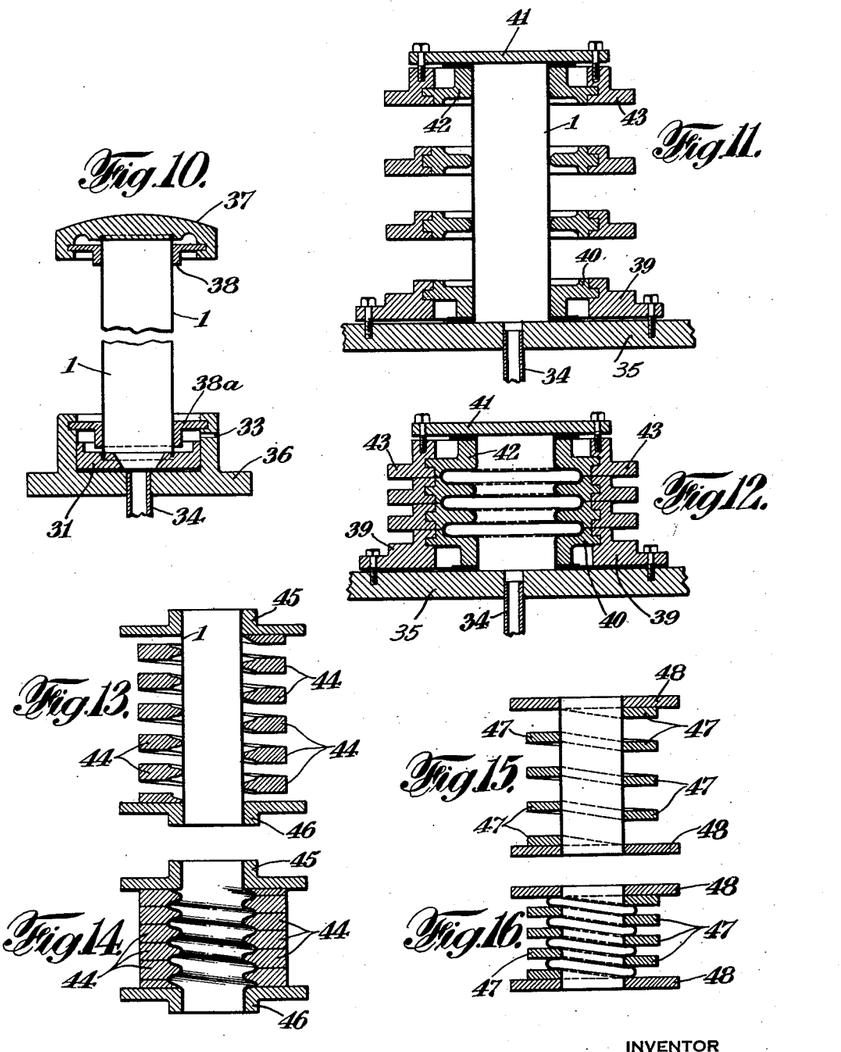
Figure 10 shows means of preventing leakage from a flangeless tube.
Figures 11 and 12 show a flanged tube in a contractible-mold at the start and finish of the operation.
Figures 13 and 14 show a tube or portion of a shell in a helical contractible-mold at the start and finish of the operation.
Figures 15 and 16 show a tube or portion of a shell in a helical contractible-mold of different form at the start and finish of the operation.

In many instances it is more convenient that the fluid enters the contractible-mold at its lower end by a pipe 34 connected to the holder 36, as shown in Figure 10 or to the table of the press, machine or bench upon which the operation is performed, as shown in Figures 11 and 12. The contractible-mold shown in Figures 10, 11 and 12 may be compressed by pressure applied to the top plates as mentioned in reference to Figure 1, or, by the punch-holder, or slide, of a power press as already described. In Figures 8 and 9 the top plate 11, and in Figure 10 the top plate 37, serves as a holder for the uppermost mold part 38. In the contractible-mold shown in Figures 11 and 12 wherein a flanged pipe is converted into an expansion and contraction length serving as an expansion joint, leakage is prevented by the upper flange being nipped between the top plate and the uppermost mold-part 42, and the lower flange of said tube is nipped between the lowermost mold-part 40 and the table or bench 35.

As the operation may be a very rapid one, in very many cases no such special provision against leakage need be made. When dealing with such shapes as are shown in Figures 24 and 26 the internal fluid pressure, when a liquid, may be applied by a plunger having a sliding fit (even a loose sliding fit) in the shell acting in conjunction with means for compressing the contractible-mold as already described.

Figure 17:
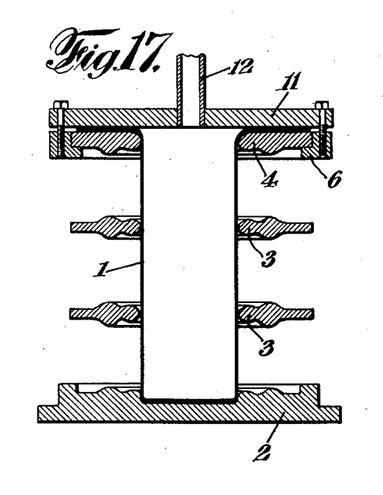
Figures 17 and 18 show a shell in a contractible-mold at the start and finish of the operation.
Figure 18:
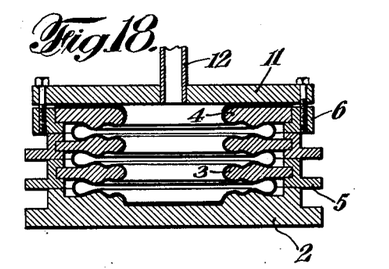
Figure 19:
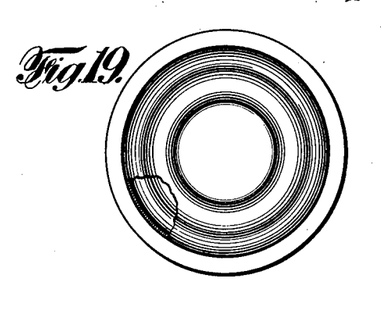
Figure 19 is a separate view of the shell as changed in shape by the operation shown in Figures 17 and 18.

The contractible-mold though consisting of separated mold-parts may yet be integral. Figures 13 and 14 show when an integral helical contractible-mold 44 is used in conjunction with mold-parts 45 and 46 converting a tube or portion of a shell into a hollow V threaded screw, shown in Figure 14. Figures 15 and 16 are a similar instance, but where the integral helical mold-part 47 and mold-parts 48 have a simpler form. In each case the tube is formed into a hollow screw where both the body and the thread are hollow. This formation has many uses such as the necks of flasks, flexible tubing, hollow screws, etc. The formed article is removed by unscrewing it from the helical contractible mold. Figures 17 and 18 show that by this method integral shapes may be obtained which otherwise would be impossible or exceedingly difficult.

Figure 20:
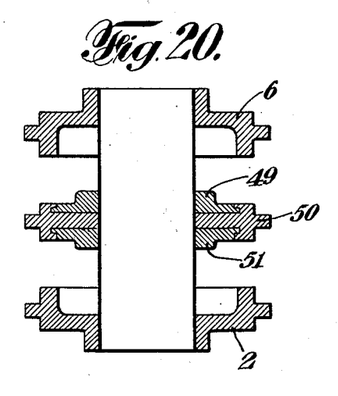
Figures 20 and 21 show a tube or portion of a shell in a contractible-mold at the start and finish of the operation.
Figure 21:
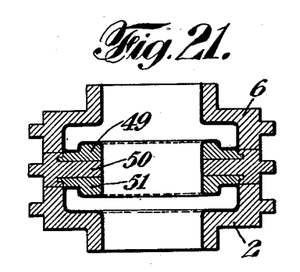
Figure 22:
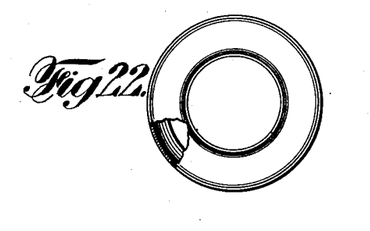
Figure 22 is a separate view of the tube as changed in shape by the operation shown in Figures 20 and 21.

Figures 20 and 21 are another example of an equally difficult shape. The central mold-part consists of three rings 49, 50 and 51 each consisting of two or more pieces as is shown in Figure 2. This construction of the mold-part is necessary for its withdrawal from the converted shape; the ring 50 being first removed permits the withdrawal of rings 49 and 51. Figures 23, 24, 25 show that both useful and ornamental shapes may be obtained in a single operation from a tube. The hollow projections 52 and 53 on the articles are for the attachment of a handle and a spout, as indicated by the dotted lines in Figure 25. The closed end of projection 53 is perforated or removed before attaching the spout. Figures 26 and 27 show a flangeless tube, provided with a contracted neck, converted into a hollow sphere.

Figures 23, 24, 25, 26, 27, 28, 29:
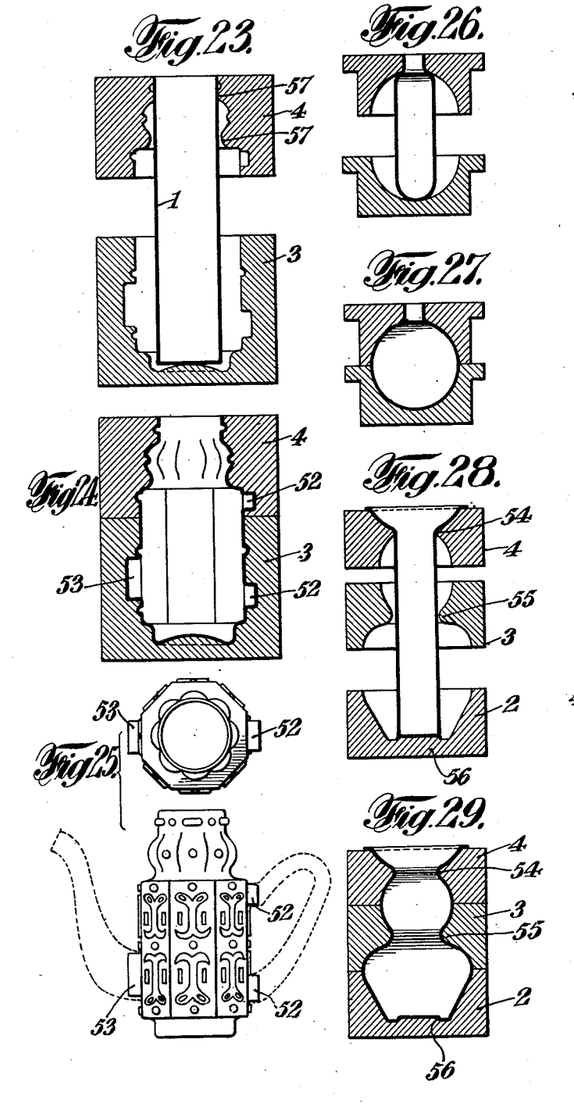
Figures 23 and 24 show a shell in a contraction-mold at the start and finish of the operation.
Figure 25 shows views at right angles of each other of the shell as changed by the operation shown in Figures 23 and 24.
Figures 26 and 27 show a shell in a contractible-mold at the start and finish of the operation.
Figures 28 and 29 show a shell in a contractible-mold at the start and finish of the operation.

Figures 28 and 29 show a cup-mouthed tube converted into a base-shaped article the surface of which may be ornamented with recessed or embossed designs to any extent, as desired.

Figure 30:
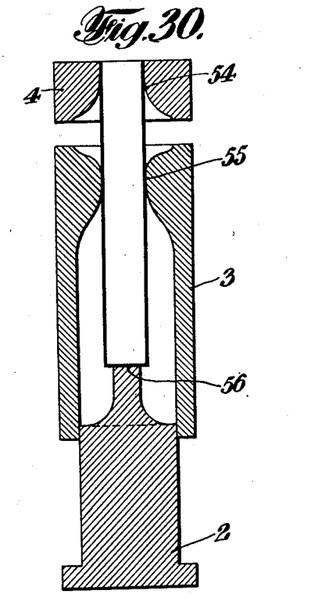
Figures 30 and 31 show a shell in a contractible-mold at the start and finish of the operation.
Figure 31:
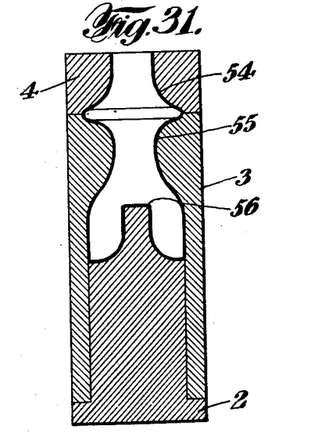

Figures 30 and 31 show a form of contractible-mold in which a mold-part slides within another mold-part. This is another example wherein an exceedingly difficult shape is obtained in a single operation.

In the contractible-molds shown in Figures 1, 4, 5, 6, 7, 11, 17 and 20 the mold-parts are shown as spaced apart equally from each other at the start of and during the entire operation. But in Figures 28, 29, 30 and 31 the mold-parts are at unequal distances apart at the start and also during the compression of the contractible-mold. Referring to Figures 29 and 31, it will be seen that the areas of the portions of the converted shell from 55 to 56 are greater than those from 54 to 55. Now the mold-parts should be spaced apart, as shown in Figures 28 and 30, so that the embraced portions of the shell have a similar proportionate area, or approximately so. For a small enlargement such as is shown at 57 in Figure 23, the discontinuity or spacing apart of the mold parts is unnecessary. The mold-parts may be positioned at their correct, though unequal, distances by means as shown in Figure 1, or as already stated, by creasings or inwardly-extending grooves formed in the wall of the shell or tube by a prior rolling or other operation, for such creasings of the shell usually suffice to retain the correct proportionate spacings during the closing together of the mold-parts. It should be understood that this creasing or grooving of the wall by hydraulic means prior to the commencement of the axial-collapsing of it is merely for the purpose of preventing the relative movement thereon of the mold-parts during the collapsing. Care should be taken that this prior bulging is not carried to an extent sufficient to appreciably increase the temper of the material for such increase would not be uniform; obviously, the higher temper would be midway between the mold-parts. The articles shown in Figure 18 are bellows-shaped diaphragms, and this appreciably higher temper midway of the creasings would be a grave defect. The bulgings, for the purpose, need not exceed the curvature shown in Figure 7 and which will not appreciably affect the temper of the material. If the creasings or grooves are formed by a prior rolling operation the temper is appreciably higher in these grooves and is decidedly advantageous in a bellows-shaped diaphragm. But it is often desirable, or even necessary, to provide means which positively control the mold-parts throughout the operation.

Figure 32:
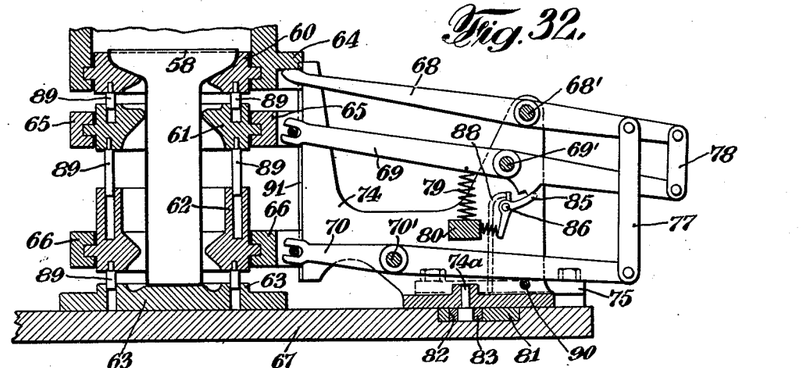
Figure 32 shows a shell in contractible-mold at the start of the operation, along with means for controlling the spacings of the mold-parts during the contraction of the contractible-mold in a rigid or positive manner.
Figure 33:
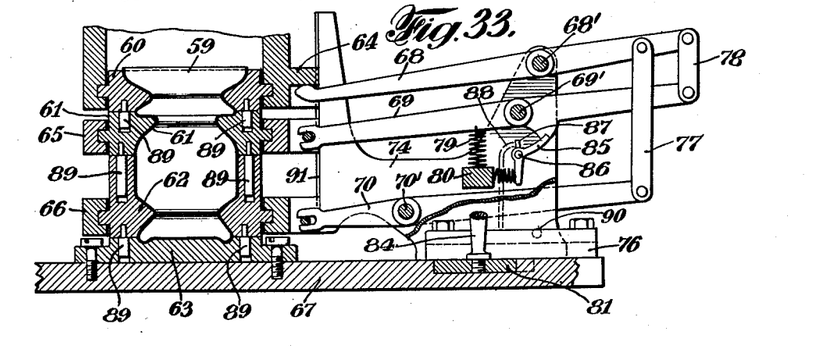
Figure 33 shows the shell and the position of the mechanism of Figure 32 at a stage near the finish of the operation.
Figure 34:
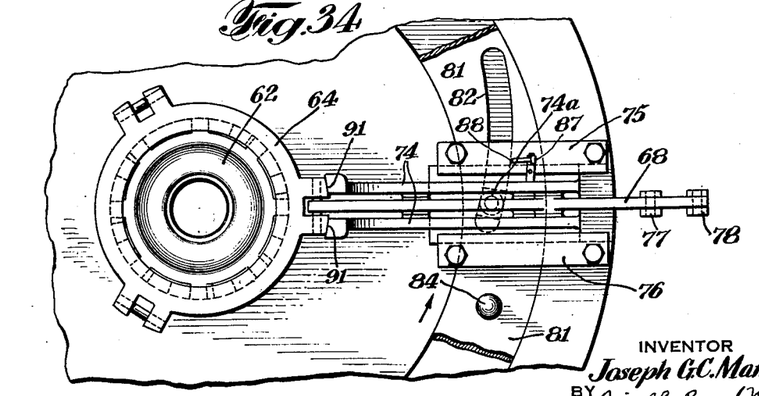
Figure 34 is a plan view of the mechanism of Figures 32 and 33 showing it in connection with one of the mold parts.

Referring to Figures 32, 33 and 34, a cup-mouthed shell 58 is converted into the shape 59 by a contractible-mold consisting of mold-parts 60, 61, 62 and 63. Mold-part 60 is held in the top plate 64, the mold-part 63 is attached to the base-plate 67, and the intermediate mold-parts 61 and 62 are held in the holders 65 and 66. Three similar brackets 74, one of which is shown, are slidably mounted on the base plate 67 by means of guides 75 and 76 secured to the base-plate and straddling a ring 81 which is slidable in an annular recess of the base-plate, and is manually operable by the handle 84. The ring 81 has three similar openings 82 in each of which a block 83 has a sliding fit. Each bracket has a stud 74ª engaging a block 83 so that when a circular movement is given to the ring 81 a movement of the three brackets, either to or from the mold-parts, occurs. Each bracket has a lever 68 fulcrumed at 68', having one arm adapted to be pressed downwardly by the top plate 64, and its other arm connected by links 77 and 78 to the arms or levers 69 and 70 fulcrumed at 69' and 70', the other arms of the levers have forked-ends adapted to actuate and to be actuated by the holders 65 and 66. The top plate 64 and the holders 65 and 66 have surfaces adapted to slide against surfaces 91 on the brackets 74 as a means of preventing lateral movement of the contractible-mold during its compression. Between the lever 69 and the portion 80 of the bracket is a compression-spring 79 which serves to raise and sustain, and a stop 90 which limits, the movement of the connected levers 68, 69 and 70, as is shown in Figure 32. A spring-seated pawl 85, secured to a shaft 86, serves to sustain the levers 68, 69 and 70 when they are in the position shown in Figure 33. Secured to an end of shaft 86 is a short lever 87 which is adapted to engage with a stop 88, supported in the guide 75, when the bracket approaches and has nearly reached, its left hand position, as shown in Figure 33. This engagement of the short lever and the stop, disengages the pawl 85 from the right hand arm of the lever, and thus permits the spring 79 to raise the levers 68, 69 and 70 along with the engaged parts of the contractible-mold to the position shown in Figure 32. The mold parts 60, 61 and 62 are provided with studs 89 adapted to slide into holes in the mold-parts immediately below them, thus serving to place and hold them in correct relative position. This provision is particularly necessary when the mold-parts are of other than circular form, transversely, or, when they carry embossed or recessed designs. Figure 32 serves to show the position of all the parts at the start of the operation, whilst Figure 33 serves the same at the finish except that the bracket is still at the extreme left hand position and that the pawl 85 is still restrained from engagement with the lever 69 by the abutment of the stop 88 with the short lever 87. When the handle 84 is moved (in direction opposite to the arrow) the levers and bracket have arrived to the position shown in Figure 33 and the pawl 85 is in engagement with lever 69. A further movement of the handle, in the same direction, brings all the levers out of engagement and clear of the contractible-mold, thus permitting the disassembling of the mold parts and the removal of the converted shell. In preparing for another operation the mold-parts are assembled as shown in Figure 33, a shell is placed therein, and the handle 84 is moved in the direction of the arrow. This movement of the handle 84 causes the engagement of the levers with the contractible-mold and then the release of the spring 79 which was energized by the preceding operation and which now raises the parts to the position shown in Figure 32, which position is that of the start of the operation already described.

In Figs. 13 to 16, 20, 21, and 23 to 34, I have not deemed it necessary to show in the drawings a sealing means for the open end or ends of the tube or shell but from the foregoing description and disclosure it will be apparent that a sealing is contemplated in order to obtain an internal fluid pressure which coacts with an axial pressure to form the articles shown in the drawings. Different types of sealing are shown in the drawings, and these could be easily adapted for use with the constructions shown.

The application of this method is not restricted to shells and tubes of a circular cross section. It is obvious that the contractible-mold may have any desired transverse or longitudinal form; either curved or rectilineal. Neither is the method limited to uniform or concentric enlargements around the axis of a shell or tube. In other words, it is not restricted to symmetrical shapes, for this method is adapted not only for the making of machine parts, such as hollow gears, but to hollow eccentrics, cams, and other parts. Parts made by this method are exact in form and size as when made from solid material, and for many purposes are preferable.

This application is filed as a division of my pending application, Serial No. 726,671, filed July 18, 1924, for Method of and apparatus for making hollow articles.

What I claim is:

1. In an apparatus for making hollow metal articles, an external former embodying a plurality of unequally distanced members engageable externally with a hollow body, controlling means co-operable with said unequally distanced members, said controlling means being shiftable into and from engagement with said members, and a plurality of co-operable pressure devices, one acting to apply pressure directly to said hollow body in the direction of the axis thereof, and the other operating to apply fluid pressure internally of said hollow body.

2. In an apparatus for making hollow metal articles, an external former embodying a plurality of movable members engageable externally with a hollow body, and a system of levers co-operable with said external former, said levers being controllable for engagement with and disengagement from said former members, in combination with a plurality of pressure devices, one acting to apply pressure directly to said hollow body in the direction of the axis thereof, and the other acting to supply fluid pressure internally of the hollow body.

3. In an apparatus for making hollow articles from metal shells or tubes, the combination of collapsing means for axially-collapsing the wall of the shell or tube, a plurality of individual mold-parts, spaced apart and surrounding the said wall, the said mold-parts constituting an axially contractible mold, hydraulic means for outwardly-expanding a portion of the said wall into the said axially-contractible mold during its contraction, controlling means, other than the shell or tube, for mechanically and positively controlling the movement of each of the mold-parts, relative to each other, during and throughout the contraction of the said axially-contractible mold, and shifting means for shifting said controlling means into and out of operable connection with said mold-parts.

4. In an apparatus for making hollow articles from metal shells or tubes, the combination of collapsing means for axially-collapsing the wall of the shell or tube, a plurality of individual mold-parts, spaced apart and surrounding the wall, the said mold-parts constituting an axially-contractible mold, hydraulic means for outwardly-expanding a portion of the wall into the said axially-contractible mold during its contraction, and a system of levers directly engaging said mold-parts and which are operated by said collapsing means and which positively control the movement of each of said mold-parts, independently of each other, during and throughout the contraction of the said axially-contractible mold, the said system of levers shiftable as a unit into engagement with the said mold-parts and said collapsing means, and also shiftable as a unit out of engagement with the said mold-parts for the purpose of removing the finished article made from the shell or tube, from the apparatus.

5. An apparatus for forming hollow articles from shells or tubes including a contractible-mold formed of a plurality of mold-parts, controlling means adapted to connect with one or more of said mold-parts and thereby positively control the movement each independently of the other, and also the distance apart from each other, of each of said mold-parts at the commencement of and throughout the contraction of the said contractible-mold, and manually-operated shifting means which by a movement in one direction connects the said controlling means with one or more of the said mold-parts and which by a movement in the opposite direction disconnects the said controlling means from the said mold-parts in a manner so as to permit the removal of the hollow article from the contractible-mold.

6. An apparatus for forming hollow articles from shells or tubes including a contractible-mold, formed of a plurality of mold-parts, controlling means adapted to connect with one or more of said mold-parts and thereby positively control the movement and distance apart from each other of each of said mold-parts at the commencement of and throughout the contraction of said contractible-mold, and of a manually-operated shifting means which by a movement in one direction effects the movement of the controlling means towards and connects them with one or more of the said mold-parts and which by a movement in the opposite direction disconnects the controlling means from the said mold-parts and also effects the movement of the controlling means away from the said mold-parts in a manner so as to permit the removal of the hollow article from the contractible-mold.

7. An apparatus for forming hollow articles from shells or tubes including a contractible-mold formed of a plurality of mold-parts and adapted to surround a hollow article supported in said contractible mold, one of said mold-parts being adapted for yieldable axial contraction, consisting of spaced-apart portions and the said spaced-apart portions being integral with each other.

8. In an apparatus for forming hollow articles from metal shells or tubes, an axially-contractible mold having a plurality of individual mold-parts for surrounding the wall of a shell or tube, hydraulic means co-acting with the said mold-parts for outwardy expanding by fluid pressure a portion of the wall between the said mold-parts, means for axially-collapsing the wall by mechanical pressure, and an operating member operating the hydraulic means and the said collapsing means in such a manner that the initial or early part of its movement operates solely said hydraulic means and a subsequent portion of its movement operates simultaneously both hydraulic means and the collapsing means.

9. In an apparatus for forming hollow articles from metal shells or tubes, an axially contractible mold having a plurality of individual mold-parts for surrounding the wall of a shell or tube, hydraulic means coacting with the said mold-parts for outwardly expanding by fluid pressure a portion of the wall between the said mold-parts, means for axially-collapsing the wall by mechanical pressure, and an operating member by a continuous movement in one direction, operating the said hydraulic means and the said collapsing means in such a manner that the early part of its movement operates solely the hydraulic means and the following part of its movement operates, simultaneously, both the hydraulic means and the collapsing means.

10. In an apparatus for making hollow articles, a spirally disposed former contacting externally with a hollow body, in combination with a plurality of pressure devices, one operating to apply mechanical pressure directly to the hollow body in the direction of the axis thereof, and the other acting to supply fluid pressure internally of the hollow body.

11. In an apparatus for making hollow articles from metal shells or tubes, the combination of collapsing means for axially-collapsing the wall of the shell or tube, an axially-contractible mold surrounding the wall and including a spirally disposed member adapted to axially-contract during the collapsing of the wall, and hydraulic means for outwardly-expanding a portion of the wall into the said axially-contractible mold during its contraction, the wall including a portion expanded between the constituent portions of the said spirally disposed member and forming a spiral thread on the wall.

12. In an apparatus for making hollow articles from metal shells and tubes, the combination of collapsing means for axially-collapsing the wall of a shell or tube, a purality of individual mold-parts, spaced apart and surrounding the wall, said mold-parts constituting an axially-contractible mold, hydraulic means for outwardly-expanding a portion of the wall into said axially-contractible mold during its contraction, controlling means, other than the shell or tube, for mechanically controlling the movements of each of the mold-parts independently of each other, during and throughout the contraction of said axially-contractible mold, said collapsing means and said hydraulic means being connected together in such a manner that the operation of one of them automatically applies the hydraulic pressure to outwardly expand the said portion of the wall, and collapses the contractible mold.

13. An apparatus for forming hollow articles from shells or tubes including a contractible-mold formed of a plurality of mold-parts adapted to receive a tube or shell, a member the initial movement of which effects an internally-applied fluid pressure to a shell or tube prior to the period of the contraction of said contractible mold and the further movement of which, during a period of sustained internally-applied fluid pressure, effects the contraction of the contractible-mold.

14. Apparatus for forming hollow articles from metal shells or tubes, including, in combination, a series of partable dies having complementary shell or tube encircling recesses, a slide, a plurality of spacer members mounted upon said slide and adapted to maintain said dies in spaced relation, and means for moving said slide transversely of said partable dies to move said spacer members into and out of operative relation thereto.

15. An apparatus for forming hollow articles from metal shells or tubes, including, in combination, an axially-contractible spiral mold for surrounding the wall of a shell or tube, hydraulic means co-acting with the said mold for outwardly expanding by fluid pressure a portion of the wall into said mold, collapsing means for axially collapsing the wall by mechanical pressure, and an operating member for operating said hydraulic means and said collapsing means in such a manner that the initial or early part of its movement operates solely said hydraulic means and a subsequent portion of its movement operates simultaneously both said hydraulic means and said collapsing means.

16. In an apparatus for forming hollow articles, an external, contractible former embodying a plurality of members engageable externally with a hollow body, and a plurality of cooperating pressure devices, one of said devices including plunger means operating to initially apply fluid pressure internally of the hollow body to form a series of preliminary bulges therein, and the other pressure device operating to apply mechanical pressure directly to the hollow body in the direction of the axis thereof and collapse the hollow body.

17. An apparatus of the character described, comprising a contractible mold having spaced mold parts adapted to surround a shell or tube, hydraulic means adapted to partially expand by fluid pressure a portion of the shell or tube between said mold parts, means for collapsing the shell or tube, and means for operating said hydraulic means in advance of said collapsing means and then for simultaneously operating both the hydraulic means and the collapsing means.

18. An apparatus of the character described, comprising a contractible mold, plunger means for creating pressure in the interior of a shell or tube placed in the contractible mold to cause the shell or tube to tightly engage the contractible mold, means for collapsing the shell or tube while maintaining the interior pressure, and means for operating said plunger means in advance of said collapsing means and then for coordinating the operation of said plunger means and said collapsing means during the collapsing operation.

19. In an apparatus of the character described, a contractible mold for surrounding a shell or tube, a plunger adapted to create an initial pressure in the interior of the shell or tube, lever means adapted to collapse the shell or tube, and means for operating said plunger in advance of the said lever means and also during the operation of said lever means.

20. An apparatus of the character described, comprising a contractible mold, hydraulic means for creating a pressure in the interior of a shell or tube positioned in the contractible mold, lever means for collapsing said contractible mold, and means for operating said hydraulic means in advance of said lever means and also during the operation of said lever means, the hydraulic means being operated at a slower rate than the lever means during the latter part of the operation.

21. An apparatus of the character described, comprising a contractible mold, hydraulic means for creating an initial pressure in the interior of a shell or tube, lever means for collapsing said contractible mold, and means for operating said lever means at a faster rate than said hydraulic means during the latter part of the operation.

22. In an apparatus of the character described, an external contractible mold including a plurality of resiliently mounted members engageable externally with a hollow article, and a plurality of cooperating pressure devices, means for operating one of said devices in advance of the other to initially apply fluid pressure internally of the hollow article and form a series of preliminary bulges therein, and means for operating the other of said devices to apply mechanical pressure to the hollow article in the direction of the axis thereof and collapse the hollow article.

23. An apparatus of the character described, including, a contractible mold formed of a plurality of mold parts and a plurality of pressure devices, said pressure devices including plunger means adapted to initially apply fluid pressure to the interior of a hollow article to form a series of preliminary bulges therein and lever means adapted to apply mechanical pressure to the hollow article in the direction of the axis thereof.

24. In an apparatus of the character described, a contractible mold for surrounding a shell or tube, hydraulic means adapted to create an initial pressure in the interior of the shell or tube, lever means adapted to collapse the shell or tube, and means for operating said hydraulic means in advance of said lever means and also during the operation of said lever means.

25. An apparatus of the character described, including, in combination, a contractible mold, hydraulic means for creating an initial pressure in the interior of a shell or tube, means for collapsing said contractible mold, and means for operating said collapsing means at a faster rate than said hydraulic means during the latter part of the operation.

26. An apparatus of the character described, including, in combination, an external contractible mold including a plurality of members engageable externally with a hollow article, and a plurality of cooperating pressure devices, one of said pressure devices comprising mechanical means for applying fluid pressure internally of the hollow article, means for operating the pressure device comprising the mechanical means in advance of the other pressure device to initially apply fluid pressure internally of the hollow article and form a series of preliminary bulges therein, and means for operating the other pressure device to apply mechanical pressure to the hollow article in the direction of the axis thereto to collapse the hollow article.

27. Apparatus of the character described for forming corrugated tubular elements from tubular metal blanks, including two heads disposed for reception therebetween of a tubular blank to be corrugated, one of the heads having an opening therethrough into the blank and being movable toward the other head, spaced die members mounted between the heads for relative movement toward each other and disposed to extend about the blank in operative relation thereto, and a pressure applying means for initially applying fluid pressure to the interior of the blank to first prebulge the blank and then for subjecting said movable head to pressure and forcing it toward the other head, said pressure applying means including a member movable relatively to said movable head for compensating for variations in the volume of the blank during corrugating thereof.

28. Apparatus of the character described for forming corrugated tubular elements from tubular metal blanks, including a series of spaced die members movable one toward the other, means for supporting a tubular blank in operative relation to the die members with the latter extending circumferentially of the blank, means for subjecting the blank to an initial radial internal pressure for initially bulging the wall of the blank radially between the die members and then to radial internal and axial pressures for contracting the blank axially while moving the die members toward each other to shape the resulting corrugations formed in the blank, said second mentioned means including two members having relative movement one toward and away from the other and an element, said element and one of said members being relatively movable axially of the blank to compensate for variations in the volume of the blank during corrugating thereof.

29. An apparatus of the character described, including, in combination, a contractible mold, means for exerting hydraulic pressure in the interior of a shell or tube positioned in the contractible mold and for exerting axial pressure for collapsing said contractible mold, and means for operating said first named means so as to subject the interior of the shell or tube to hydraulic pressure to prebulge the shell or tube in advance of exerting a collapsing axial pressure and to subject the interior of the shell or tube to hydraulic pressure during the collapsing of the contractible mold, said pressure exerting means being operated so as to compensate for variations in the volume of the shell or tube during corrugating thereof.

30. An apparatus of the character described for forming hollow corrugated articles from metal shells or tubes, including, in combination, a contractible mold having a plurality of individual mold parts for surrounding the wall of a shell or tube, hydraulic means cooperating with said mold parts for outwardly expanding by internal fluid pressure the wall of the shell or tube between said mold parts, collapsing means for axially collapsing the wall of the shell or tube by mechanical pressure, and an operating member for operating said hydraulic means and said collapsing means so as to exert pressure interiorly of the shell or tube and an external pressure on the wall of the shell or tube to form a corrugated article and also to compensate for variations in the volume of the shell or tube during corrugation thereof.

31. In an apparatus for making hollow articles from metal shells or tubes, the combination of collapsing means for axially collapsing the wall of a shell or tube, an axially-contractible mold for surrounding the same wall and comprising a plurality of individual mold-parts, one of said mold-parts contacting with the end of the shell or tube and adapted to axially-slide within another of the said mold-parts, and hydraulic means for expanding a portion of the wall between said mold parts during the axial collapsing of the wall of the shell or tube.

32. In an apparatus of the character described, a contractible mold for surrounding a shell or tube, plunger means adapted to partially expand a portion of a shell or tube, means including a cam member for collapsing the shell or tube, and means for actuating said plunger means in advance of said collapsing means.

33. An apparatus of the character described, comprising a contractible mold, hydraulic means for expanding a portion of the wall of a shell or tube, means including a pivoted cam member and levers for collapsing said contractible mold, and means for operating said hydraulic means in advance of said collapsing means at the beginning of the operation.

34. An apparatus of the character described, comprising a contractible mold, hydraulic means for creating a pressure in the interior of the shell or tube positioned in the contractible mold, lever means for collapsing said contractible mold, a cam member for operating said lever means, and means for operating said hydraulic means and said cam member to form a corrugated shell or tube.

35. An apparatus of the character described, comprising a contractible mold, hydraulic means for creating a pressure in the interior of a shell or tube positioned in the contractible mold, lever means for collapsing said contractible mold, a pivoted cam member for operating said lever means, and means for operating said hydraulic means in advance of the lever means, and also during the operation of said lever means.

36. An apparatus of the character described, comprising a contractible mold, hydraulic means for creating a pressure in the interior of a shell or tube positioned in the contractible mold, a plurality of levers for collapsing said contractible mold, a pivoted cam member, one of said levers being provided with a roller adapted to contact and follow the surface of the cam member, and means for operating said hydraulic means and said cam member and levers to form the corrugated shell or tube.

37. An apparatus of the character described, comprising a contractible mold, hydraulic means for creating a pressure in the interior of a shell or tube positioned in a contractible mold, a member operating said hydraulic means, means pivoted adjacent said member and provided with a curved surface on one end, the other end thereof being adapted to be operated by said member, and means for collapsing said contractible mold, said last-mentioned means being controlled by the curved surface of said pivoted means.

38. An apparatus of the character described, comprising a contractible mold, hydraulic means for creating an initial pressure in the interior of a shell or tube, a plurality of levers for collapsing said contractible mold, means including a pivoted cam member for controlling the movement of said levers, and means for operating said hydraulic means and said last-named means to form a corrugated shell or tube.

39. An apparatus of the character described, comprising a contractible mold for surrounding a shell or tube, plunger means adapted to partially expand a portion of the shell or tube, and means including a cam member for collapsing the shell or tube, said cam member being so shaped as to permit differential movement of the plunger means and said second-named means.

40. An apparatus of the character described, comprising a contractible mold, hydraulic means for expanding a portion of the wall of a shell or tube, means including a pivoted cam member for collapsing said contractible mold, and a member for operating said hydraulic means in advance of said collapsing means and during the operation of said collapsing means.

41. An apparatus of the character described, comprising, a contractible mold, a plunger adapted for movement to expand a portion of the wall of a shell or tube, means for collapsing said contractible mold, said means including a plurality of cooperating levers and a pivoted cam member.

42. In an apparatus of the character described, a contractible mold including a plurality of holders, removable mold parts therein, and curved leaf springs co-operating with said holders for maintaining said holders in spaced relation.

43. In an apparatus of the character described, a contractible mold including a plurality of formers, spring for maintaining said formers in spaced relation, said springs being attached at one end to one former and the other end being removably mounted in another former.

44. An apparatus of the character described, comprising a holder formed with an annular groove and spaced notches communicating with the groove, said holder comprising mold parts provided with spaced lugs which are adapted to be positioned in said notches so that the mold parts may be positioned in the holder and by a slight twist or turn can be securely held together in the holder.

45. An apparatus of the character described, comprising a holder formed with an annular groove and comprising mold parts provided with spaced lugs, said lugs being adapted to be positioned in the groove so as to be securely held in the holder.

46. In an apparatus of the character described, a mold including a plurality of integral holders provided with complementary, separable, mold parts, and means for resiliently maintaining said holders in spaced relation.

47. An apparatus of the character described, comprising a contractible mold including a plurality of integral holders provided with complementary, separable, mold parts, and springs for maintaining said holders in spaced relation, each of said springs being attached at one end to one holder and having the other end removably mounted in another holder.

48. An apparatus of the character described, including a contractible mold comprising a plurality of holders provided with mold parts, and springs for maintaining said holders in spaced relation, each of said springs being attached at one end to one holder and having the other end removably mounted in another holder.

JOSEPH G. C. MANTLE.